(12) United States Patent
Becker et al.

(10) Patent No.: US 6,866,204 B2
(45) Date of Patent: Mar. 15, 2005

(54) END OF VALVE MOTION DETECTION FOR A SPOOL CONTROL VALVE

(75) Inventors: Joerg Christoph Becker, Auburn Hills, MI (US); Guenter Hammer, Sinzing (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 55 days.

(21) Appl. No.: 10/116,207

(22) Filed: Apr. 4, 2002

(65) Prior Publication Data

US 2002/0145054 A1 Oct. 10, 2002

Related U.S. Application Data

(60) Provisional application No. 60/282,933, filed on Apr. 10, 2001.

(51) Int. Cl.$^7$ ................................................. F02D 1/06
(52) U.S. Cl. .......................... 239/5; 239/88; 239/585.1; 239/124; 123/508; 137/554
(58) Field of Search ............................. 239/88–96, 124, 239/5; 123/446, 447, 508, 507; 137/554

(56) References Cited

U.S. PATENT DOCUMENTS

| | | | |
|---|---|---|---|
| 3,596,507 A | | 8/1971 | Oshima et al. |
| 4,503,820 A | | 3/1985 | Nakagawa |
| 4,775,816 A | * | 10/1988 | White et al. ................. 310/338 |
| 5,022,358 A | * | 6/1991 | Richeson ................. 123/90.12 |
| 5,125,807 A | * | 6/1992 | Kohler et al. ............... 417/490 |
| 5,237,968 A | * | 8/1993 | Miller et al. .............. 123/90.11 |
| 5,248,123 A | * | 9/1993 | Richeson et al. .............. 251/29 |
| 5,341,787 A | * | 8/1994 | Zabeck et al. ............... 123/520 |
| 5,463,996 A | * | 11/1995 | Maley et al. ................ 123/446 |
| 5,722,373 A | * | 3/1998 | Paul et al. .................. 123/446 |
| 5,752,659 A | * | 5/1998 | Moncelle ...................... 239/88 |
| 5,988,142 A | | 11/1999 | Klopfer |
| 6,053,421 A | | 4/2000 | Chockley |
| 6,120,005 A | | 9/2000 | Wright |
| 6,196,184 B1 | | 3/2001 | Przymusinski et al. |
| 6,308,690 B1 | * | 10/2001 | Sturman ..................... 123/508 |
| 6,450,778 B1 | * | 9/2002 | Spoolstra et al. ........... 417/307 |

FOREIGN PATENT DOCUMENTS

WO  WO9811334  3/1998

OTHER PUBLICATIONS

Specification for U.S. Appl. No. 10/095,805, filed Mar. 12, 2002.
PCT International Search Report for Application No. PCT/US02/10899 dated Aug. 8, 2002.

* cited by examiner

*Primary Examiner*—Dinh Q. Nguyen

(57) ABSTRACT

A fuel injector system (10) includes a piezoelectric sensor (52) mounted along a spool valve axis (18) of the injector body (12). The piezoelectric sensor (52) is mounted within a spool valve stop (41). As the spool valve (16) reaches the stop (41), the piezoelectric sensor (52) identifies the force exerted thereupon and transmits the generated signal to the controller (44). Through communication with piezoelectric sensor (52) the controller determines when the spool valve (16) has reached a predetermined position.

7 Claims, 2 Drawing Sheets

END OF VALVE MOTION DETECTION FOR A SPOOL CONTROL VALVE

The present application claims priority to U.S. Provisional Patent Application Ser. No. 60/282,933, filed 10, Apr. 2001.

BACKGROUND OF THE INVENTION

The present invention relates to a fuel injector system, and more particularly to a method of determining the end of motion of a fuel injector spool control valve.

Fuel injectors typically use a high pressure fluid acting on a relatively large area intensifier piston to compress fuel under a smaller area plunger. When fuel pressure is raised above a valve opening pressure, a needle check valve lifts to open the nozzle outlet, and fuel sprays into the combustion space within an engine.

To accurately control the timing of each injection event, the fuel injectors commonly include a solenoid actuated spool valve that opens and closes the fuel injector to the high pressure actuation fluid. The spool valve is essentially an armature movable relative to a solenoid coil located at each axial end of the spool valve.

Each injection event is initiated by energizing one coil to move the control valve to an open position, and each injection event is ended by actuating a second solenoid coil opposite the first coil to move the spool valve back to its closed position. The fluid-actuated fuel injector de-couples the injection quantity and timing from the operation of the engine to provide flexibility of main pilot fuel quantity, timing, and duration.

Control of the injection event through actuation of the coils to selectively drive the spool control valve. Distinguishing when the spool valve has reached the end of travel may be difficult and relatively imprecise due to the extremely small timing envelope of an injection event.

Accordingly, it is desirable to provide a method of reliably determining when a fuel injector spool control valve reaches the end of motion.

SUMMARY OF THE INVENTION

The fuel injector system according to the present invention includes a piezoelectric sensor mounted along a spool axis adjacent a spool control valve stop. As the spool control valve reaches the stop, the piezoelectric sensor identifies the force exerted thereupon and transmits the detected signal to the controller. A controller communicates with piezoelectric sensor to determine when the spool control valve has reached the end of travel. The rapid response of the piezoelectric sensor provides a precise identification even in the extremely small timing envelope of an injection event.

The controller communicates with the piezoelectric sensor during a plurality of timing windows which are located at positions in which the valve is expected to reach a desired position. So long as the valve signal occurs within the window, the spool control valve is operating in a desired manner. If the valve signal is not within the window however, a defective valve is readily determined.

The present invention therefore provides a method of reliably determining when a fuel injector spool control valve reaches the end of motion.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
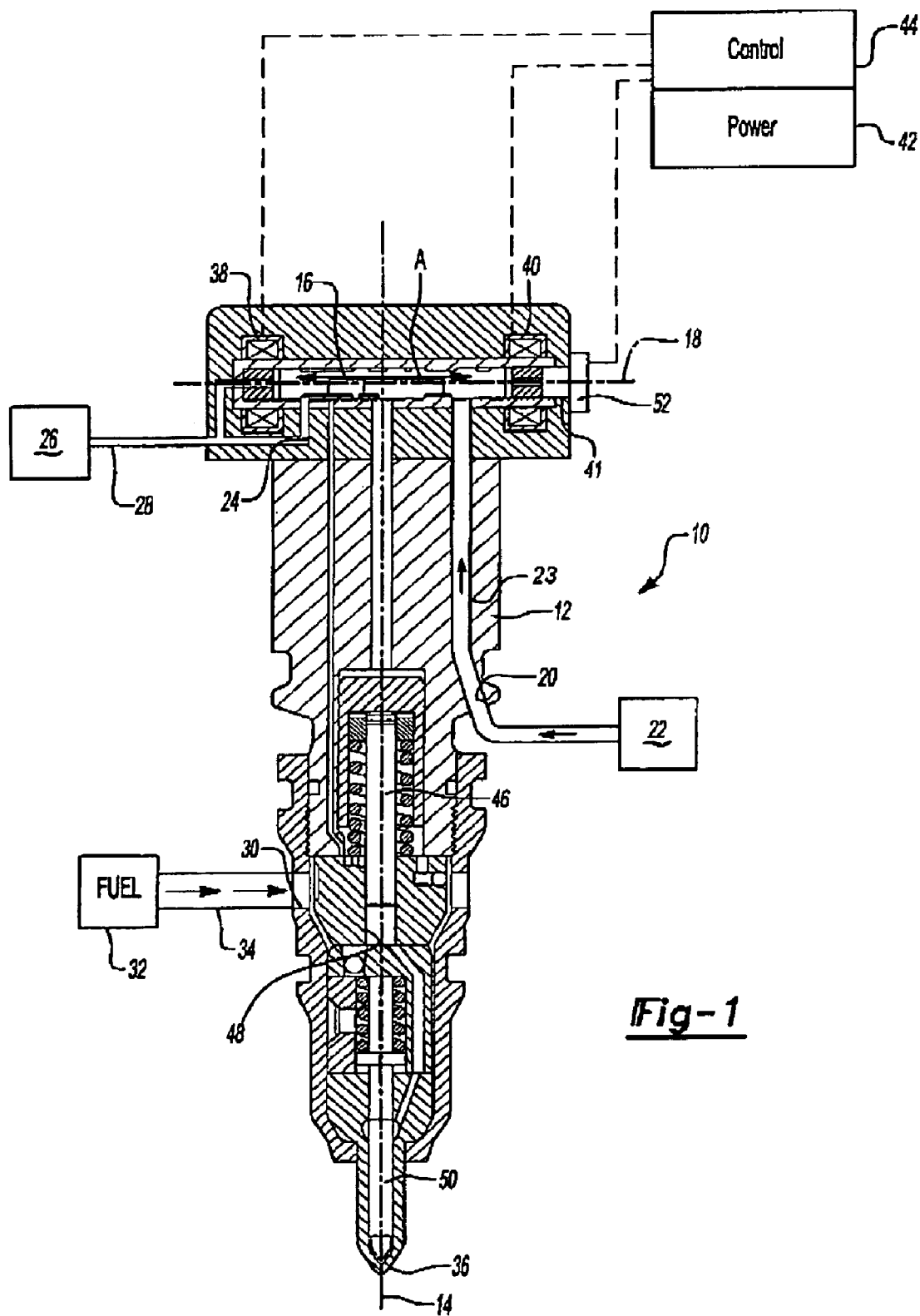
FIG. 1 is a general perspective view fuel injector system for use with the present invention.

FIG. 1 illustrates a general perspective view of a fuel injector system 10. The fuel injector includes an injector body 12 which defines an injector axis 14. An electrically controlled spool valve 16 is movable (as schematically illustrated by arrow A) within the injector body 12 along a spool valve axis 18 defined substantially perpendicular to the injector axis 14. The injector body 12 defines an actuation fluid inlet 20 which communicates with a high pressure actuation fluid source 22 via an actuation fluid supply passage 23. An actuation fluid drain 24 communicates with a low pressure return reservoir 26 via a drain passage 28. Injector body 12 also defines a fuel inlet 30 which communicates with fuel source 32 through a fuel supply passage 34 such that fuel from the fuel source 32 is directed thorough a nozzle outlet 36 that is preferably appropriately positioned within the combustion space of an internal combustion engine.

A first and second opposed electric coil 38, 40 are mounted at each end of the electrically controlled spool valve 16. Each coil 38, 40 is connected to a power source (illustrated schematically at 42) and a controller (illustrated schematically at 44). The electrically controlled spool valve 16 is attracted to the coil 38, 40 which is selectively energized by the power source 42. It should be understood that although a particular injection is disclosed in the illustrated embodiment various injections will benefit from the present invention.

As generally known, when a coil 38, 40 is energized, the spool valve 16 begins moving toward the energized coil 38, 40. A stop 41 or the like is preferably located at each end of the spool valve 16. To initiate an initiate an injection, the spool valve 16 is moved to a first position in which the fluid supply passage 23 is opened and high pressure actuation fluid acts upon an intensifier piston (illustrated schematically at 46), and begins moving it toward a fuel pressurization chamber (illustrated schematically at 48). Fuel pressurization chamber 48 receives fuel from the fuel source 32 through fuel supply passage 34. Piston 46 increases pressure within the fuel pressurization chamber 48 until the pressure rises to a level which opens a needle valve member (illustrated schematically at 50) and fuel is sprayed thorough the nozzle outlet 36.

A piezoelectric sensor 52 is mounted along the spool valve axis 18 of the injector body 12 and communicates with the power source 42 and the controller 44. The piezoelectric sensor 52 is preferably mounted to at least partially within the stop 41. As the spool valve 16 contacts stop 41, the piezoelectric sensor 52 identifies the force exerted thereupon and transmits the detected valve signal to the controller 44. Through communication with the controller 44, piezoelectric sensor 52 the controller 44 determines when the spool valve 16 has reached a predetermined position such as its end of travel. It should be understood that signal interpretation is generally known and one reasonably skilled in the art will readily relate a desired predetermined valve position with particular signal characteristics. The rapid response of the piezoelectric sensor 52 provides a precise identification even in the extremely small timing envelope of an injection event.

Figure 2:
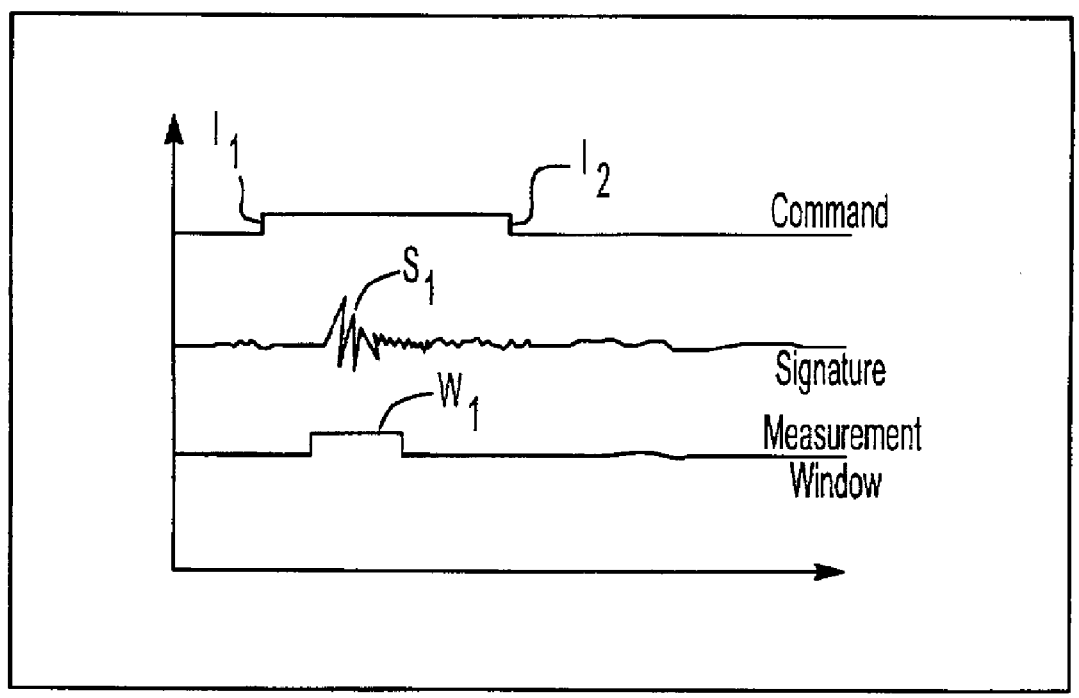
FIG. 2 is a schematic representation of a timing window and measured signal as determined by the piezoelectric sensor.

Referring to FIG. 2, an electric coil 38, 40 (FIG. 1) command is initiated at point I1 and terminated at point I2. Algorithms for the operation of the opposed electric coils 38, 40 for fuel injectors are known and are typically controlled by the controller 44. The movement of the spool valve 16 (FIG. 1) results in a signal S when the spool valve 16 contacts the piezoelectric sensor 52. Identification of the signal S indicates that the spool valve 16 has reached a desired predetermined position such as in contact with stop 41. The controller 44 then terminates power to the electric coil 38, at command I2. It should be understood that the duration of between command I1 and I2 may be adjusted by the controller 44 to compensate for stiction of the spool valve or other operational conditions. That is, sending of command I2 does not occur until signal S is identified by the piezoelectric sensor 52. It should also be understood that although described with reference to one of the coils 38, 40 adjacent the spool valve 16, a similar method is implemented relative the opposite coil 40, 38.

Preferably, the signal from piezoelectric sensor 52 is correlated with a measurement window W1. The window W1 is located at positions in which the valve 16 is expected to reach a desired position. The timing windows W1 are preferably implanted in software stored in the controller 44, however, other solid-state components will also benefit from the present invention. It should be understood that the windows may be separated regularly or irregularly dependent upon the desired operation of the fuel injector system 10 as determine by the controller 44. So long as the valve signal S1 occurs within the window W1, the valve 16 is operating in a desired manner. If the valve signal is not within the respective window W, however, a defective spool valve operation is readily determined. It should be understood that various additional or alternative filtering and detecting features may be implemented through the controller 44.

Preferably, the controller 44 controls the command signal and calculates the timing of the spool valve 16. The controller 44 determines the corresponding timing of the measurement window W. As long as the valve signal S1 occurs within the calculated measurement window W1, the controller verifies that the fuel injectors are operating within proper limits. However, should no vibration signal be identified during the measurement window, the controller 44 will determine that a problem exists. For example, no vibration signal will be present for a stuck spool valve 16. Further, as the measurement windows W1 is located at the optimal timing location for a predetermined position of the spool valve, a vibration signature indicative of early or late operation will not correspond with the measurement window which is also indicative of a problem. In response to such a problem, the controller 44 will then provide an alert such as a warning light or the like such that corrective action for the particular malfunctioning injector can be provided.

It should be understood that the present invention is not limited to a microprocessor based control system. The system may also be implemented in a non-microprocessor based electronic system (either digital or analog).

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of injecting fuel comprising the steps of:
    (1) providing a fuel to a spool valve movable between a first and a second coil such that the spool valve selectively provides fuel flow to a fuel injector when the spool valve is located in a first position and prevents fuel flow to the fuel injector in a second position;
    (2) locating a piezoelectric sensor adjacent the spool valve;
    (3) measuring a signal generated by the piezoelectric sensor;
    (4) determining a predetermined position of the spool valve in response to said step (3); and
    (5) locating a measurement window within a time period defined between a first command signal and a second command signal.

2. A method as recited in claim 1, wherein said step (3) is performed within a predetermined timing window.

3. A method as recited in claim 1, wherein the signal is a voltage.

4. A method as recited in claim 1, further comprising the step of locating the piezoelectric sensor within a stop adjacent the spool valve.

5. A method as recited in claim 1, further comprising the step of: identifying a signal from the piezoelectric sensor in response to contact between the spool valve and the piezoelectric sensor.

6. A method as recited in claim 5, further comprising the step of: determining whether the signal from the piezoelectric sensor is within the measurement window.

7. A method as recited in claim 1, wherein said step (2) comprises
    moving the spool valve along a spool valve axis to selectively contact the piezoelectric sensor.

* * * * *